(12) United States Patent
Huang et al.

(10) Patent No.: US 8,306,276 B2
(45) Date of Patent: Nov. 6, 2012

(54) BRIDGE STRUCTURAL SAFETY MONITORING SYSTEM AND METHOD THEREOF

(75) Inventors: Chi-Hung Huang, Hsinchu (TW); Wei-Chieh Chiang, Changhua County (TW); Tai-Shan Liao, Hsinchu (TW); Chia-Wei Hsu, Hsinchu (TW); Jen-Yu Wen, Hsinchu (TW); Tzu-Hsuan Wei, Taipei (TW); Yung-Hsiang Chen, Hsinchu (TW)

(73) Assignee: National Applied Research Laboratories, Taipei (TW)

( * ) Notice: Subject to any disclaimer, the term of this patent is extended or adjusted under 35 U.S.C. 154(b) by 687 days.

(21) Appl. No.: 12/572,437

(22) Filed: Oct. 2, 2009

(65) Prior Publication Data
US 2011/0044509 A1    Feb. 24, 2011

(30) Foreign Application Priority Data
Aug. 24, 2009 (TW) ............................... 98128456 A

(51) Int. Cl.
*G06K 9/00*           (2006.01)
(52) U.S. Cl. ..................................... 382/107; 340/539.3
(58) Field of Classification Search .................. None
See application file for complete search history.

(56) References Cited

U.S. PATENT DOCUMENTS

| | | | |
|---|---|---|---|
| 6,292,108 B1 * | 9/2001 | Straser et al. | 340/870.11 |
| 7,081,693 B2 * | 7/2006 | Hamel et al. | 307/151 |
| 2006/0169900 A1 * | 8/2006 | Noji et al. | 250/310 |
| 2010/0271199 A1 * | 10/2010 | Belov et al. | 340/539.3 |

FOREIGN PATENT DOCUMENTS

| | | |
|---|---|---|
| TW | 200608003 A | 3/2006 |
| TW | 200827715 A | 7/2008 |
| TW | I310898 B | 6/2009 |

OTHER PUBLICATIONS

"2008 Status of the nations highways, bridges and transit conditions and performance"US department of transportation report to congress,Oct. 2008.www.fhwa.dot.gov/policy/2008cpr/pdfs/cp2008.pdf.*
English Abstracts of TW 200608003A, 200827715A, and I310898B.

* cited by examiner

*Primary Examiner* — Wesley Tucker
*Assistant Examiner* — Nancy Bitar
(74) *Attorney, Agent, or Firm* — WPAT, P.C.; Anthony King

(57) ABSTRACT

The present invention discloses a bridge structural safety monitoring system and a bridge structural safety monitoring method. The method includes the steps of capturing an image of a monitoring area of a bridge to create a standard image of the bridge operated at normal conditions, capturing images of the monitoring area of the bridge continuously to obtain monitoring images, comparing the standard image with the monitoring image to obtain a displacement correlation coefficient of the monitoring area of the bridge, and transmitting the displacement correlation coefficient to a central console, such that the central console can determine the using condition of the bridge according to the displacement correlation coefficient.

16 Claims, 6 Drawing Sheets

BRIDGE STRUCTURAL SAFETY MONITORING SYSTEM AND METHOD THEREOF

BACKGROUND OF THE INVENTION

1. Field of the Invention

The present invention relates to a monitoring system, in particular to a monitoring system applied for monitoring a bridge structural safety.

2. Description of the Related Art

As bridge inspection is a continuous ongoing job, and the inspection is divided into the following two types according to its purpose:

1. A timely inspection for monitoring a situation such as a water level or an exposure extent of a bridge pier timely provides the current situation prior to the occurrence of a disaster or an emergency situation.

2. A periodical inspection for testing factors such as deformation, displacement, force distribution, appearance damage or material deterioration that may affect or change a bridge system.

At present, the bridge inspection methods adopted by Taiwan, R.O.C. for daily inspections are divided into the following three kinds in accordance with the Maintenance Manual for Railways and Bridges promulgated by the Ministry of Transportation and Communications:

(a) Regular Patrol: it takes place weekly or daily;
(b) Periodic Inspection: it takes place twice a year; and
(c) Special Inspection: it takes place after the occurrence of a disaster or an emergency situation.

Three main inspection methods are visual inspection, non-destructive inspection and destructive inspection.

The inspection procedure includes a visual observation of a bridge, and a non-destructive or a destructive inspection of the bridge whenever there is any doubt, wherein the non-destructive inspection includes the following:

(1) Surface hardness method;
(2) Surface strength method;
(3) Acoustic wave inspection method;
(4) Maturity inspection method; and
(5) Comprehensive inspection method.

The destructive inspection exerts a pressure or a pulling force at a portion of the structure to create a destructive effect to test a structural strength.

In the conventional method, the visual inspection is the most important step of the bridge inspection, and standards of evaluating a bridge condition include DER&U evaluation and ABCDN evaluation methods, for example.

DER&U evaluation method is a visual inspection and evaluation method for bridges jointly developed by Join Engineering Consultants, and South African CSIR Company, and the bridge inspection is divided into 21 inspection items, wherein the first to eleventh items relate to general inspections and overall macro inspections of bridges, and the twelfth to twentieth items relates to span inspection, and the twenty-first item relates to miscellaneous inspections.

ABCDN evaluation method is a visual inspection and evaluation method for bridges developed by China Engineering Consultants in 1996 for Taiwan Provincial Government and Department of Urban Development. The ABCDN evaluation method divides a bridge structure into eight main structures, respectively: bridge deck components, upper structure, bridge pier, foundation and soil, bridge abutment and approach, support, variable gap and other accessory facilities, and each type of structures is divided into several inspection objects, and each inspection object is subdivided into several inspection items, and all inspection items are categorized into four grades (A~D), and an inspection item is categorized as Grade N if such inspection item is not applicable or its damage condition cannot be determined

TABLE 1

| | DER&U Evaluation Guideline | | | | |
|---|---|---|---|---|---|
| | 0 | 1 | 2 | 3 | 4 |
| Level | N/A | Good | Average | Poor | Seriously Damaged |
| Scope | Uninspectable | | | | |
| Importance | Undeterminable | Tiny | Low | Middle | High |
| Urgency | Undeterminable | Routine Maintenance | Within 3 years | Within 1 year | Emergency Handling and Maintenance |

TABLE 2

| ABCDN Evaluation Guideline | |
|---|---|
| Grade | Conditions |
| A | Slight damage requires key-point inspection. |
| B | Some damages require further monitoring, and repairs if needed. |
| C | Significant damages require repairs. Deformation keeps occurring, and the functionality may drop. |
| D | Significant damages with substantial deformation and drop of functions of the structure require emergency repairs to assure the safety and smoothness of traffic or avoid hindering a third party. |
| N | Not applicable, or the damage condition is undeterminable. |
| OK | Occasions other than those mentioned above. |

The periodical inspection of a bridge adopts a visual inspection of the characteristics, and uses each standard to determine the conditions of the bridge. Even for an automated process, the process is connected automatically to a database used by the DER&U or ABCDN as a determination basis to facilitate an engineer at site to determine the bridge conditions.

In addition, most automatic monitoring technologies used for monitoring a displacement and a deformation of a bridge are measured by a contact method, and sensors are installed at different places on the bridge, such as displacement sensors are installed for measuring displacement pointwise, strain sensors are buried for measuring the strain level of bridge's structures, and acceleration sensors are used for measuring the vibration of the bridge. The aforementioned sensors are provided for converting measured physical parameters, such as deformation, stress, strain and acceleration into signals to establish a bridge deformation measuring system.

As to the measurement of water depth of a river, vertical resistors are preinstalled onto a bridge pier, and the change of resistance caused by a water level can be used for measuring the water depth of the river, and the extent of exposure of the bridge pier.

The bridges in the U.S. are inspected by the Federal Highway Administration (FHWA), and the inspections are categorized into the following five types:

(1) Routine examination (2 or 4 years);
(2) Key damage examination;
(3) Special characteristic examination;
(4) Underwater inspection; and
(5) Other inspections.

The aforementioned routine examination is equivalent to the periodical inspection of the Ministry of Transportation and Communications of R.O.C., wherein the visual inspection is adopted or photos are taken during a normal inspection period not exceeding 24 months. In addition to taking photos of a damage or a deterioration of the bridge, cross-sectional drawings and data of a river, component examination forms, work suggestions, component identifications are key damage characteristics required to be stored into the database, and a change of time of the database is used for determining whether or not to perform a destructive inspection. The database includes SMART, BIRIS and bridge references, and other items include key damage examination, special characteristic examination, underwater examination, and other examinations are categorized as special inspection.

From the description above, the U.S. bridge examination methods are the same as the R.O.C. inspection methods, and both are based on the manually measured records and neither is a bridge structural safety monitoring system with a visual observation function.

In the aforementioned methods, bridges are examined passively according to the laws and regulations, and none of the methods can provide a structural damage report timely/anytime or provide an early warning or in-time warning. In an extreme weather condition (such as a typhoon or a heavy storm) or after an earthquake occurs, the bridge may be damaged seriously and cannot be inspected visually timely. Related engineers or technicians are sent to the dangerous sites for the inspection. Particularly, in the extreme weather condition, the engineers and technicians are unable to reach the site to inspect the bridge or provide an early warning when the bridge could be seriously damaged, and it may result in an injury of the citizen and the property loss.

SUMMARY OF THE INVENTION

Therefore, it is a primary objective of the present invention to provide a bridge structural safety monitoring system to overcome the shortcoming of the prior art incapable of providing an instant structural damage report of a bridge.

A secondary objective of the present invention is to provide a bridge structural safety monitoring system to overcome the problem of unable to provide a warning timely.

Another objective of the present invention is to provide a bridge structural safety monitoring system to replace a regular visual inspection method, so as to lower the labor requirement, and avoid inspectors from being exposed in dangerous areas.

To achieve the foregoing primary objective, the present invention provides a bridge structural safety monitoring system, comprising an imaging optical system module, an image correlation computing module, a network communication module and a central console. The imaging optical system module is located (constructed) in the bridge site for imaging a standard image of a monitoring area of a bridge operated at normal conditions, and taking photos of the monitoring area of the bridge continuously to obtain a series monitoring images of the monitoring area of the bridge, and the image correlation computing module uses an image data comparison method to compute the standard image and the monitoring images to obtain a displacement correlation coefficient of a relative displacement among structures of the bridge, and the network communication module transmits the displacement correlation coefficient to the central console, such that the structural report of the bridge can be obtained timely/anytime.

If the water level of a river rises rapidly, the monitoring system can be used for monitoring the condition of the bridge pier being washed by water currents and the relative displacement signal among structures of the bridge to provide a safety evaluation of the bridge.

To achieve the foregoing other objective, the present invention provides a bridge structural safety monitoring system, wherein a central console uses a displacement correlation coefficient to evaluate the level of a loading deformation of the bridge. If the deformation of a bridge has reached a critical deformation value, an early-warning system installed to the central console will issue a warning signal to overcome the problem of unable to provide a warning timely.

To achieve the foregoing other objective, the present invention provides a bridge structural safety monitoring system, wherein a central console uses a displacement correlation coefficient to evaluate the using condition of a bridge. If the displacement correlation coefficient is abnormal, the central console will be switched from a data monitoring mode into an image monitoring mode, and engineers at the central console can obtain a monitoring image of a monitoring area of the bridge, and know about the current condition of the bridge by observing the monitoring image.

The image correlation computing module adopts a characteristic sampling method to monitor key positions, and these characteristics correspond to the characteristics of the human visual method and simulate each evaluation standard in the evaluation guideline according to the value of the displacement correlation coefficient to create a database, and such database can replace the regular visual method, so as to achieve the effect of reducing the labor requirement and avoiding the inspectors from being exposed to the dangerous area.

To achieve the foregoing objectives, the present invention provides a bridge structural safety monitoring method comprising the steps of using an imaging optical system module to obtain at least one standard image of at least one monitoring area of a bridge at a normal operation condition; using the imaging optical system module to take photos of each monitoring area continuously to obtain a plurality of monitoring images of the monitoring area; using an image correlation computing module and an image data comparison method to compare the standard image with each the monitoring image, so as to obtain a displacement correlation coefficient of a relative displacement among structures of the bridge; and transmitting the displacement correlation coefficient to a central console, so that the structural report of the bridge can be obtained timely/anytime.

In summation, the bridge structural safety monitoring system of the present invention has the following advantages:

1. A non-contact imaging optical system module is provided for obtaining a monitoring image and a standard image, and an image correlation computing module is provided for estimating a relative displacement coefficient automatically to obtain a change of bridge conditions.

2. The deformation conditions of bridges are observed instantly and spontaneously.

3. The automatic imaging and automatic displacement coefficient evaluatin inspection are used in order to save tremendous labor force.

4. The image can be captured continuously at all weathers, and monitored at all time.

5. The invention adopts a full automatic image comparison method to automatically monitor a deformation of the bridge at regular days, such that when a disaster occurs, the image monitoring is switched to the actual image for confirmation. A multiple of functions is included in a single system.

6. The bridge structural safety monitoring system can be installed to present bridges without a need of building the system at the same time of building the bridge. The system can be used by present existing bridges or applied for monitoring old bridges.

7. The imaging optical system module and the image correlation computing module can be updated continuously and extended to each bridge.

8. The quantity and the installation position of the imaging optical system module can be changed for measuring the characteristics and monitoring the weak points of the bridge.

DETAILED DESCRIPTION OF THE PREFERRED EMBODIMENTS

The technical characteristics of the present invention will become apparent with the detailed description of the following preferred embodiments and related drawings.

Figure 1:
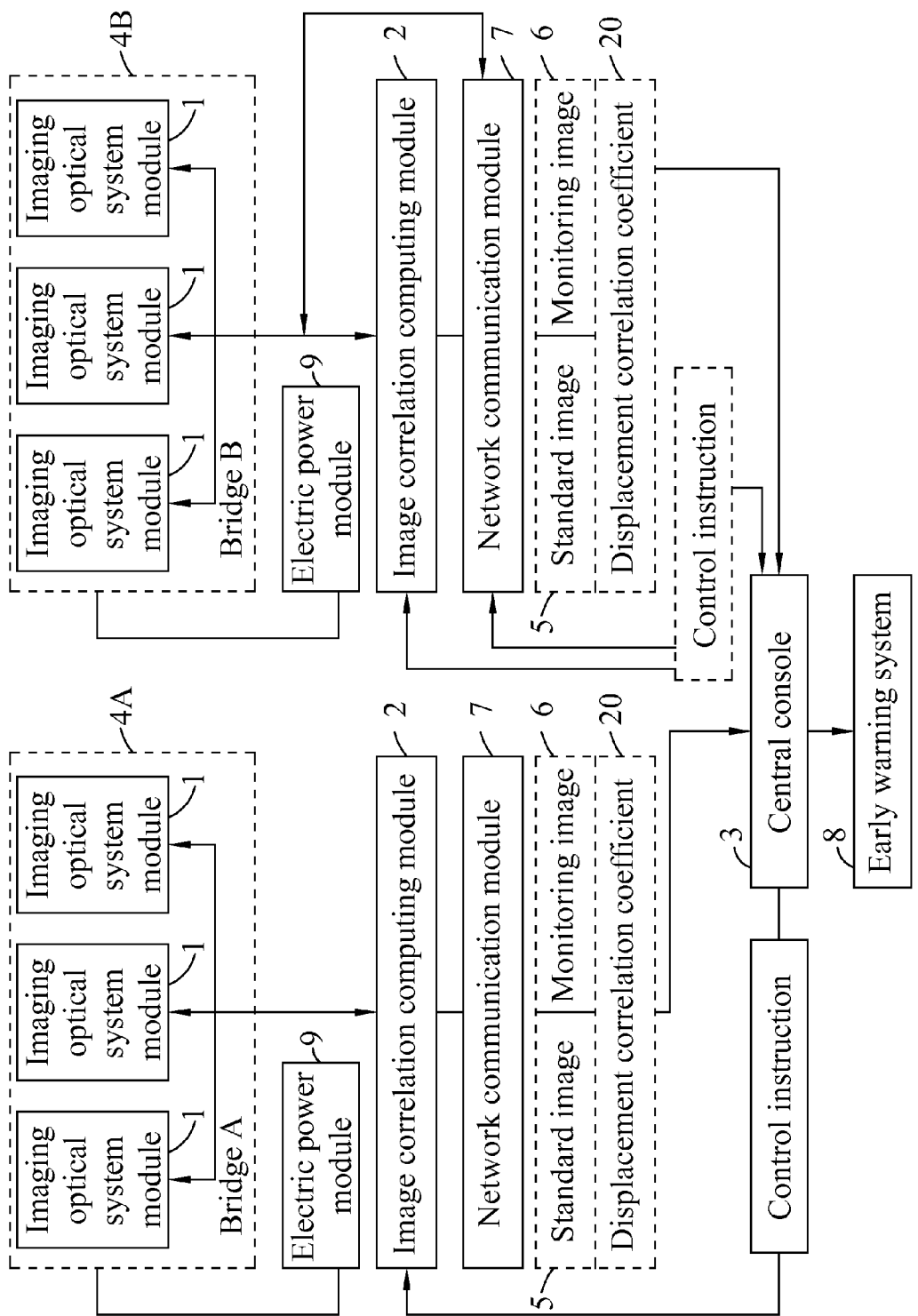
FIG. 1 is a schematic structural diagram of a bridge structural safety monitoring system in accordance with the present invention.
Figure 2:
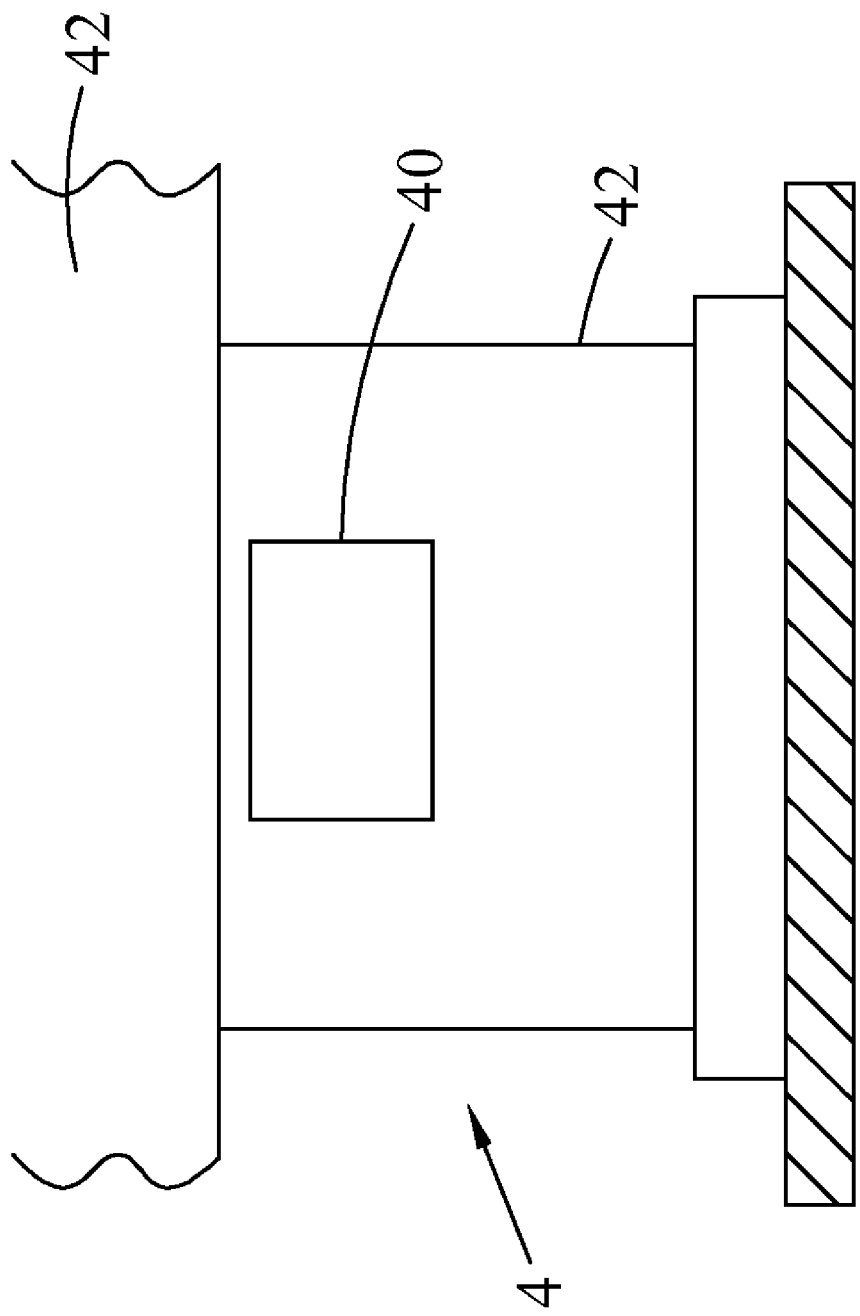
FIG. 2 is a schematic diagram of a monitoring area in accordance with a preferred embodiment of the present invention.
Figure 3:
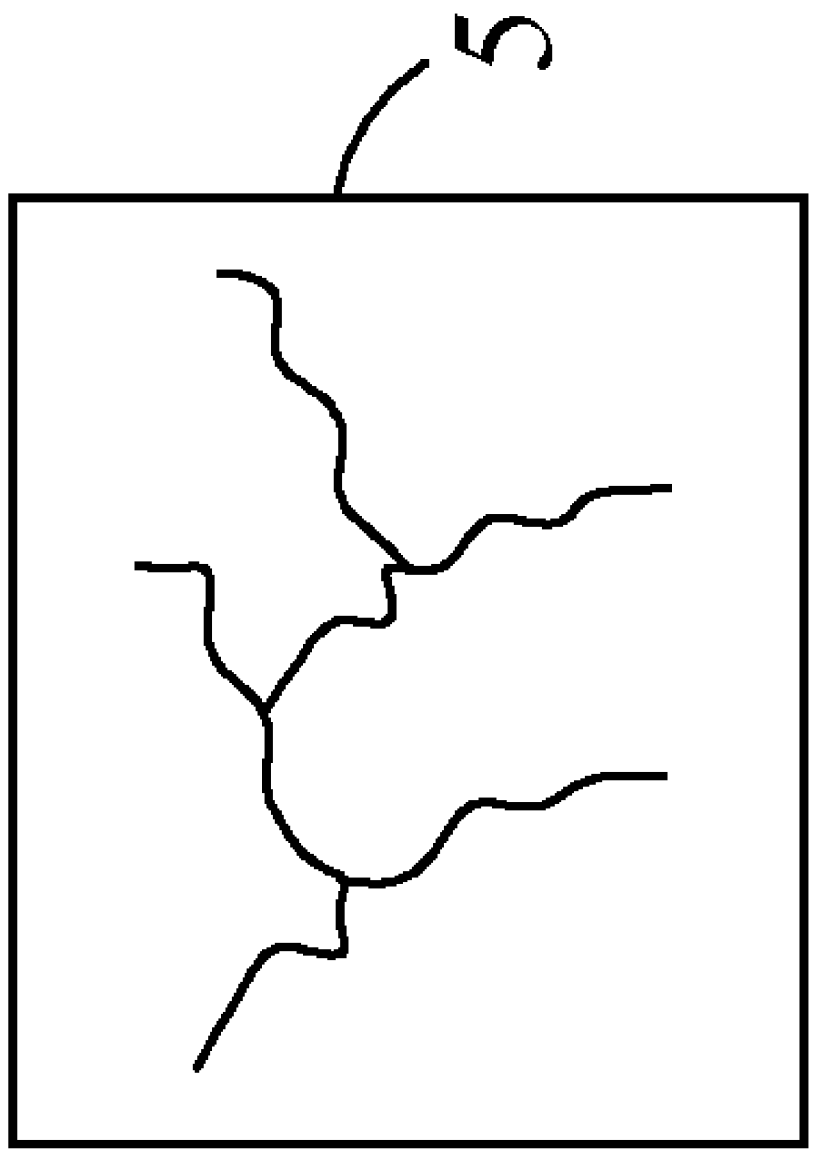
FIG. 3 is a schematic diagram of a standard image in accordance with a preferred embodiment of the present invention.
Figure 4:
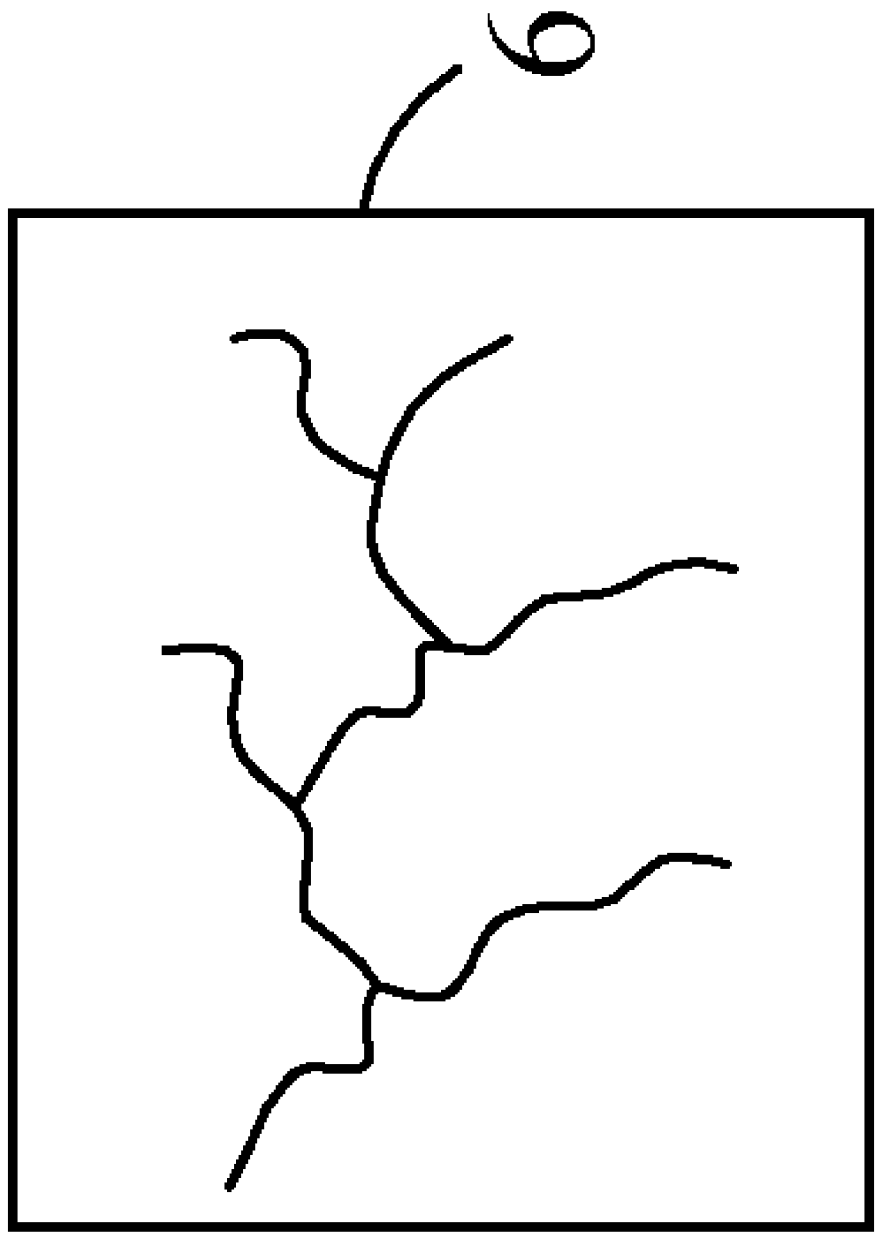
FIG. 4 is a schematic diagram of a monitoring image in accordance with a preferred embodiment of the present invention.

With reference to FIG. 1 for schematic structural diagram of a bridge structural safety monitoring system in accordance with the present invention, the system is construction among at least one imaging optical system module 1, an image correlation computing module 2 and a central console 3. Each imaging optical system module 1 captures images of a bridge A 4A and a bridge B 4B of a monitoring area 40 respectively (as shown in FIG. 2) to create a standard image 5 of a bridge 4 operated at normal conditions (as shown in FIG. 3), and continuously capture images of the monitoring area 40 to obtain a monitoring image 6 (as shown in FIG. 4). The image correlation computing module 2 compares the standard image 5 with the monitoring image 6 to obtain a displacement correlation coefficient 20 of the monitoring area 40 of the bridge 4, and the displacement correlation coefficient 20 is transmitted to the central console 3 through the network communication module 7, and the central console 3 determines the using condition of the bridge 4 according to the displacement correlation coefficient 20.

With reference to FIG. 2 for a schematic diagram of a monitoring area in accordance with a preferred embodiment of the present invention, the monitoring area 40 is situated at each sub-structure 42 (such as a bridge pier, a bridge deck and a bridge column, etc) of the bridge 4 that may be deformed, and the imaging optical system module 1 monitors a relative displacement in a different direction of each sub-structure 42. Therefore, it is necessary to install a plurality of imaging optical system modules 1 in the monitoring areas 40, and the quantity of imaging optical system modules 1 varies with the number of the monitoring areas 40, such that a standard image 5 of each monitoring area 40 can be established, and monitoring images 6 of the monitoring area 40 of each sub-structure 42 can be obtained continuously.

In the preferred embodiment as shown in FIG. 1, the image correlation computing module 2 transmits the displacement correlation coefficient 20, the standard image 5 and the monitoring image 6 to the central console 3 through the network communication module 7. In addition, the imaging optical system module 1 includes a data monitoring mode and an image monitoring mode, wherein the data monitoring mode transmits the displacement correlation coefficient 20 to the central console 3, and the image monitoring mode transmits the monitoring image 6 to the central console 3.

In addition, the central console 3 is situated at a position away from each bridge 4 for controlling each imaging optical system module 1, such that each imaging optical system module 1 can be switched between the data monitoring mode and the image monitoring mode, and a visual observation can be used for assisting the determination of the damage conditions of the bridge 4.

In addition to controlling the imaging optical system module 1, the central console 3 can add or update an application program required for the imaging optical system module 1 and the image correlation computing module 2 for performing an overall evaluation of the displacement correlation coefficient 20 related to the deformation of each bridge 4, wherein the overall evaluation of the central console 3 refers to the evaluation of a loading deformation level of the bridge 4 evaluated by the central console 3 according to the displacement correlation coefficient 20.

The central console 3 further comprises an early-warning system 8 for issuing warning signal, if the displacement correlation coefficient 20 of the bridge 4 has reached a critical deformation value, so as to overcome the problem of unable to provide a warning timely. In addition, the central console 3 evaluates the using condition of the bridge 4 according to the displacement correlation coefficient 20. If the displacement correlation coefficient 20 is abnormal, (such as approaching the critical deformation value or having a substantial change of numeric values), the central console 3 will be switched from the data monitoring mode to the image monitoring mode, and personnel at the central console 3 can obtain the monitoring image 6 of the monitoring area 40 of the bridge 4 directly, and confirm the current condition of the bridge 4 through the observation of the monitoring image 6.

In addition, a star network or a tree network is built between the image correlation computing module 2 and the central console 3, and the connection between the imaging optical system module 1 and the central console 3 can be via a wireless network or a cable network for executing a control instruction (such as switching to a monitoring mode) and transmitting the displacement correlation coefficient 20, the standard image 5 and the monitoring image 6.

Figure 5:
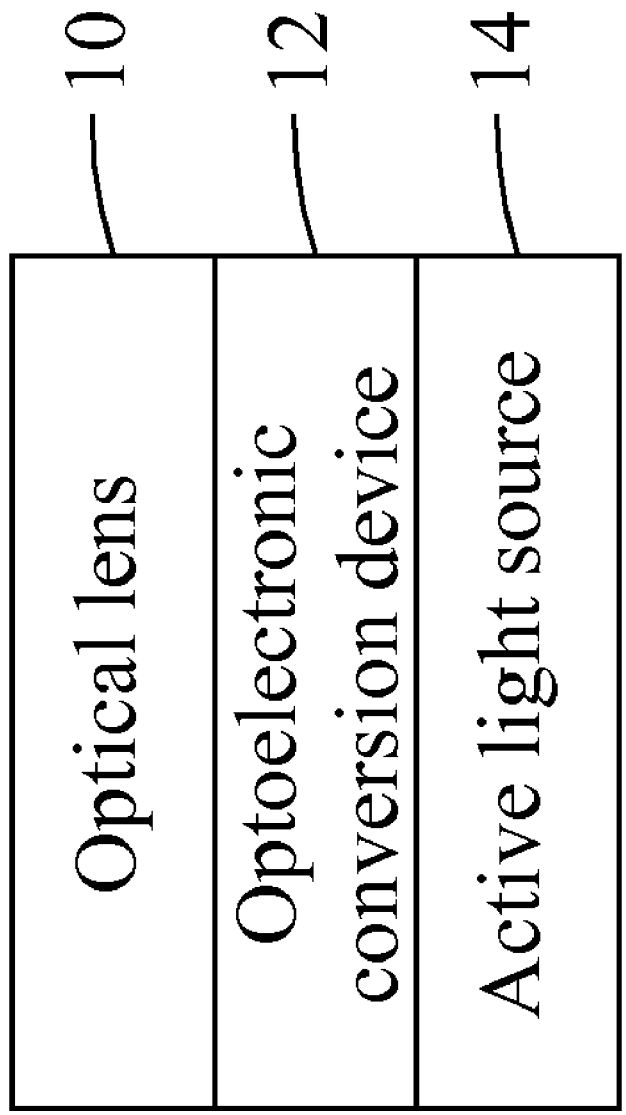
FIG. 5 is a schematic diagram of an imaging optical system module in accordance with a preferred embodiment of the present invention.

With reference to FIG. 5 for a schematic diagram of an imaging optical system module in accordance with a preferred embodiment of the present invention, the imaging optical system module 1 comprises an optical lens 10, an optoelectronic conversion device 12 and a active light source 14, wherein the optoelectronic conversion device 12 is a charge-coupled device (CCD) or a complementary metal oxide semiconductor (CMOS), and the active light source 14 can be an externally installed device depending on the operating environment of the bridge 4, and the active light source 14 has a spectral range including but not limited to a visible light or a near infrared wave band.

The image correlation computing module 2 further simplifies the standard image 5 and each monitoring image 6, and computes the monitoring images 6 at different timing to obtain the displacement correlation coefficients 20 of the monitoring images 6 at different timing. In addition, the image correlation computing module 2 compares the surface characteristic, shape, color of the monitoring image 6 at a different timing with the standard image 5, and converts the characteristics into displacement correlation coefficients 20.

The bridge 4 refers to an artificial construction made of steel (or any other metal) and steel reinforced concrete and built across a river, a lane, a valley or any location other than the earth surface.

The imaging optical system module 1 further comprises an electric power module 9 for receiving a utility power, not only supplying electric power to the imaging optical system module 1, but also including an energy storage unit and a power management unit, such that if the power management unit determines that the electric power module 9 has received the utility power, the electric power will be stored in the energy storage unit, and if the power management unit determines that the electric power module 9 has not received the utility power, then the energy storage unit will supply electric power to the imaging optical system module 1 to assure a normal operation of the imaging optical system module 1 when a natural disaster occurs.

In addition, the network communication module 7 can be a physical cable network, a wireless transmission network, or a combination of physical cable network and wireless transmission network, wherein the physical cable network refers to a network using a transmission medium such as a twisted pair, a coaxial cable, or a fiber optic cable for the communications, and the wireless transmission network refers to a network using a microwave or infrared transmission medium for the communications, and the electromagnetic wave signal of a microwave has a transmission frequency ranging from 2 GHz to 40 GHz, and infrared beam is emitted by a light emitting diode (or a laser) with a transmission frequency ranging from 100 GHz to 1000 THz.

The network installed between the image correlation computing module 2 and the central console 3 can be a wireless wide area network (WWAN), which is a wireless network class with the broadest transmission range capable of covering wireless networks in the entire nation or between different countries, and such network is generally built and maintained by special service providers (such as ChungHwa Telecommunications) and a general user just use the wireless wide area network through a terminal device (such as the network communication module 7 of the present invention). The wireless network communications system such as the global system for mobile communications (GSM) or the third generation mobile communications system (3G) used in present mobile phones belong to WWAN.

In a preferred embodiment of the present invention, the imaging optical system module 1 or the imaging optical system module controlled by the central console 31 at a remote end sets up a characteristic area for identifying the standard image 5 and the monitoring image 6, and integrating the characteristics data into a numeric array I(t), and then uses a comparison algorithm to compare the images and compute the displacement correlation coefficient 20 of the bridge 4, and this displacement correlation coefficient 20 is used for evaluating the displacement condition of the bridge 4, wherein the algorithm includes the following two methods:

1. Image Area Analysis:

All images including the obtained standard images 5 and monitoring images 6 are included for the computation, and an image area analysis is used for categorizing the image characteristics, and each image area is used as a basis for computing the displacement correlation coefficient 20, and the computation of the displacement correlation coefficient 20 can be estimated by using a digital image related function.

2. Characteristic Sampling Method:

To speed up the system, it is necessary to reduce and simplify the volume of data of the monitoring image 6, and thus a partial characteristic sampling is adopted to reduce the computation time substantially, and the sampling characteristics are selected according to the inspection nature. For example, if it is necessary to monitor a broken section of a bridge 4, then the relative displacement of the bridge pier and the bridge deck is the most important monitoring target, and the relative joint angle of the bridge pier and the bridge deck can be selected as the characteristic.

In addition, the digital image (including the standard image 5 and the monitoring image 6) is captured by the optical module under the bridge 4, and the boundary of the bridge deck and the bridge pier are used as computation data, and each boundary of the bridge deck and the bridge pier is situated on a characteristic curve of identifying the bridge deck and the bridge pier respectively, and the characteristic curve can be obtained automatically by the boundary search theory. The characteristic curve includes the data situated at reserved positions of the digital image array, and the data situated on the characteristic curve can be interated into a simplified data array I(t). Simplified characteristics arrays I(t) of the images captured at different time points can be obtained, and these characteristics arrays I(t) are compared continuously to obtain a displacement correlation coefficient 20 that represents the extent of the image deformation.

Taking the cross-correlation for example, we can obtain instant characteristics curve arrays of the obtained monitoring images 6, and the cross-correlation coefficient of the original characteristics array of the standard image 5, and such cross-correlation coefficient can be considered as a critical factor of the bridge 4, and the numeric value of the cross-correlation coefficient is a negative correlation to the level of danger of the bridge 4, and the related calculation is given below:

(1) Normalized Cross Correlation Coefficient $$\Phi = \frac{\sum_{i,j=CZ/2}^{CZ/2}[I_1(i,j) \times I_2(i',j')]}{\left[\sum_{i,j=CZ/2}^{CZ/2}[I_1(i,j)]^2 \times \sum_{i,j=CZ/2}^{CZ/2}[I_2(i',j')]^2\right]^{1/2}} \quad (1)$$

(2) Least Squares Correlation Coefficient $$\Phi = \sum_{i,j=CZ/2}^{CZ/2} [I_1(i,j) - I_2(i',j')]^2 \qquad (2)$$

The symbols used in Equations (1) and (2) are described below:

Φ: Cross-correlation coefficient is a correlation of between a pair of characteristic vectors;

$I_1$, $I_2$: can be characteristic vectors of the same image, as well as any two different images;

CZ is a selected vector range, which is equal to 1, if $I_1=I_2$ when it is used as a normalized cross correlation coefficient. If CZ is not equal to 1, the closer the CZ approaches 1, the higher is the level of similarity.

The denominator $$\left[ \sum_{i,j=CZ/2}^{CZ/2} [I_1(i,j)]^2 \times \sum_{i,j=CZ/2}^{CZ/2} [I_2(i,j)]^2 \right]^{1/2}$$

of the normalized cross correlation coefficient is called normalizing. If the calculation or form of the denominator is changed, or this portion is canceled, then the maximum value of Φ will change, regardless of the change of the normalizing. Such modification is intended to be covered into the claim of the present invention.

Equation (2) is a changed form of Equation (1), but their principles are the same. If the least squares correlation coefficient of Equation (2) is used, regardless of going through the normalizing procedure or not, and $I_1=I_2$, then the value of Φ will be equal to 0. If the value of Φ is not equal to 0, then the lower the value of Φ, the higher is the level of similarity.

Figure 6:
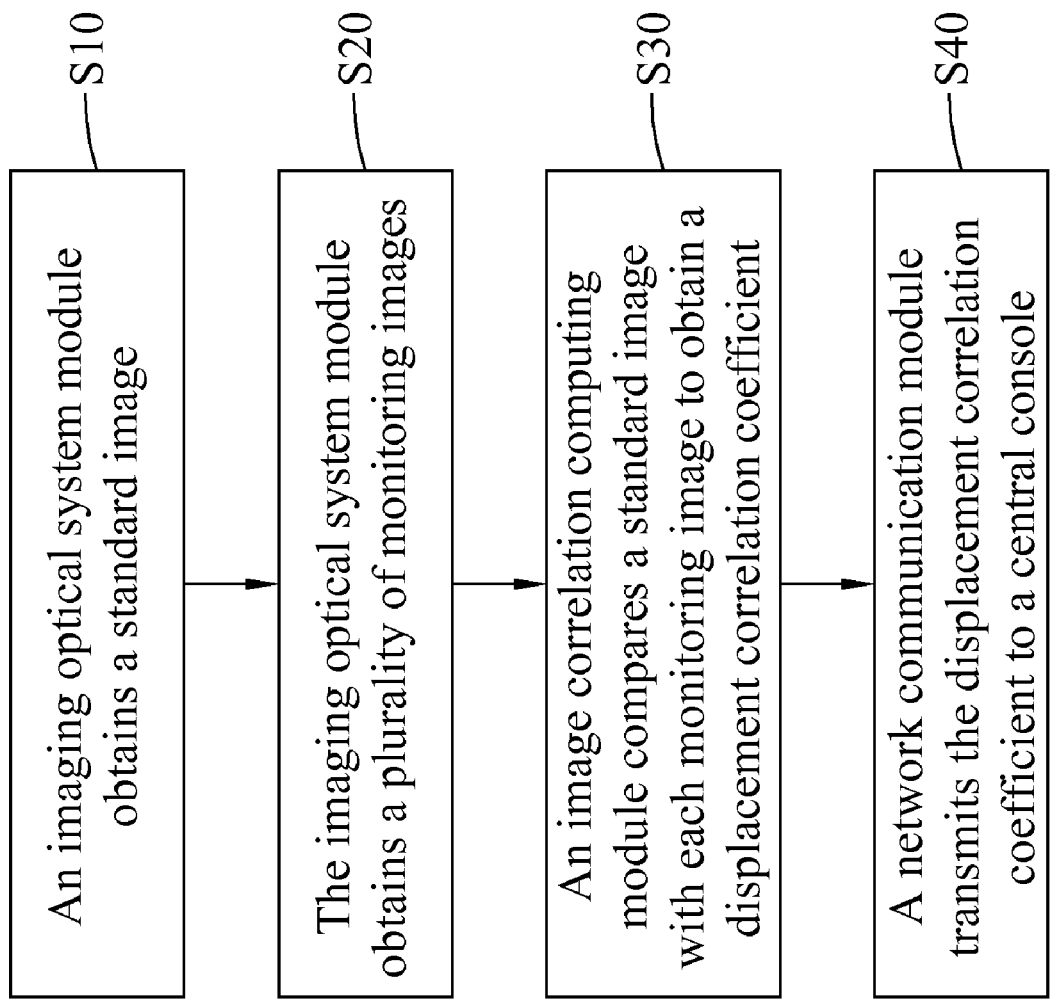
FIG. 6 is a flow chart of a bridge structural safety monitoring method in accordance with the present invention.

With reference to FIGS. 1 and 6, FIG. 6 shows a flow chart of a bridge structural safety monitoring method in accordance with the present invention, the method applicable to a bridge structural safety monitoring system comprises the steps of:

(S10) using an imaging optical system module 1 to obtain a standard image 5 of at least one monitoring area 40 of at least one bridge 4 operated at normal conditions;

(S20) taking photos of each monitoring area 40 of the imaging optical system module 1 continuously to obtain a plurality of monitoring images 6 of each monitoring area;

(S30) using an image correlation computing module 2 and an image data comparison method to compare a standard image 5 with each monitoring image 6, so as to obtain a displacement correlation coefficient 20 of a relative displacement among the structures of a bridge 4; and (S40) using a network communication module 7 to transmit the displacement correlation coefficient 20 to a central console 3, so as to obtain a structural report of the bridge 4.

An image data comparison method is used for comparing the surface characteristic, shape and color of the monitoring image 6 of the monitoring area 40 of the bridge 4 captured at a different timing with the standard image 5, and converting them into displacement correlation coefficients 20.

If the central console 3 determines that the displacement correlation coefficient 20 has reached a critical deformation value, an early-warning system 8 installed at central console 3 will issue a warning signal to each bridge 4.

If the central console 3 determines that the displacement correlation coefficient 20 is abnormal (such as approaching a critical deformation value), the central console 3 will drive the imaging optical system module 1 to be switched from the data monitoring mode to the image monitoring mode, and personnel at the central console 3 can obtain the monitoring image 6 of the monitoring area 40 of the bridge 4 directly by the network communication module 7 to confirm the current condition of the bridge 4 through the observation of the monitoring image 6. As soon as the central console 3 confirms the bridge warning, an alarm signal is sent to the mobile phones on people or cars near the bridge through the telecom companies.

In summation of the description above, the characteristic sampling method used by the image correlation computing module 2 monitors key positions, and such characteristics correspond to characteristics of the human visual method, and simulates each evaluation standard of the evaluation guideline according to the numerical value of the displacement correlation coefficient 20, and replaces the regular visual method after a database is created. Therefore, the invention can replace the visual method to achieve the effect of reducing the labor force and avoiding the engineers or technicians from being exposed to the dangerous areas.

What is claimed is:

1. A bridge structural safety monitoring system, comprising: an imaging optical system module arranged for capturing an image of at least one monitoring area of a bridge to create a standard image under a normal operation condition of the bridge, and continuously capturing images of the monitoring area to obtain a plurality of monitoring images; an image correlation computing module arranged for comparing the standard image with the plurality of monitoring images to obtain a plurality of displacement correlation coefficients of the monitoring area of the bridge; and a central console arranged for receiving each displacement correlation coefficient, and determining a using condition of the bridge according to each displacement correlation coefficient; wherein the imaging optical system module further comprises an electric power module for receiving a utility power to supply an electric power required by the imaging optical system module; and wherein the electric power module comprises: an energy storage unit arranged for receiving a utility power, storing the electric power into the energy storage unit, and supplying the electric power to the imaging optical system module if the energy storage unit has not received the utility power; and a power management unit arranged for evaluating whether or not the energy storage unit has received the utility power, and controlling the energy storage unit to store the electric power or supply the electric power.

2. The system of claim 1, wherein the image correlation computing module is connected to a network communication module, and the network communication module transmits the displacement correlation coefficient, the standard image and the plurality of monitoring images to the central console.

3. The system of claim 1, wherein the monitoring area of the bridge comprises a plurality of sub-structures that may be deformed.

4. The system of claim 3, wherein the sub-structure is at least one selected from the collection of a bridge pier, a bridge deck and a bridge column.

5. The system of claim 3, wherein the imaging optical system module monitors a relative displacement in a different direction among the sub-structures.

6. The system of claim 2, wherein the imaging optical system module includes a data monitoring mode and an image monitoring mode, and the data monitoring mode transmits the displacement correlation coefficient to the central console, and the image monitoring mode transmits the monitoring image to the central console.

7. The system of claim 6, wherein the central console is situated at a position away from the bridge, and provided for controlling the imaging optical system module, and switching the imaging optical system module between the data monitoring mode and the image monitoring mode.

8. The system of claim 7, wherein the central console further comprises an early-warning system for issuing a warning signal if the displacement correlation coefficient of the early-warning system reaches a critical deformation value.

9. The system of claim 8, wherein the central console is switched from the data monitoring mode to the image monitoring mode when the displacement correlation coefficient of the central console is abnormal.

10. The system of claim 8, wherein the displacement correlation coefficient approaches the critical deformation value, if the displacement coefficient is abnormal.

11. The system of claim 1, wherein the central console adds or updates an application program required for the imaging optical system module and the image correlation computing module.

12. The system of claim 1, wherein the imaging optical system module comprises an optical lens, an optoelectronic conversion device and an active light source.

13. The system of claim 1, wherein the image correlation computing module receives the standard image and the monitoring image captured by the imaging optical system module, and simplifies the standard image and the monitoring image, and computes the monitoring image at different timing to obtain the displacement correlation coefficient of the monitoring image at different timing.

14. The system of claim 13, wherein the image correlation computing module uses the standard image as a standard for comparing and converting the surface characteristic, shape, and color of each monitoring image at a different timing into the displacement correlation coefficient.

15. A bridge structural safety monitoring method, comprising the steps of:
  using an imaging optical system module to obtain at least one standard image of at least one monitoring area of a bridge at a normal operation condition;
  using the imaging optical system module to take photos of each monitoring area continuously to obtain a plurality of monitoring images of the monitoring area;
  using an image correlation computing module and an image data comparison method to compare the standard image with each the monitoring image, so as to obtain a displacement correlation coefficient of a relative displacement among structures of the bridge; and transmitting the displacement correlation coefficient to a central console; wherein if the central console evaluates the displacement correlation coefficient has reached a critical deformation value, an early-warning system installed to the central console will issue a warning signal to the bridge and wherein if the central console evaluates the displacement correlation coefficient is abnormal, the central console will drive the imaging optical system module to be switched from a data monitoring mode into an image monitoring mode, and the data monitoring mode transmits the displacement correlation coefficient to the central console, and the image monitoring mode transmits the monitoring image to the central console.

16. The method of claim 15, wherein the image data comparison method further comprises the steps of comparing the surface characteristics, shape, and color of the standard image of the monitoring area with each monitoring image obtained at a different timing, and converting a comparison result into the displacement correlation coefficient.

\* \* \* \* \*